US012568049B2

(12) United States Patent
Qian et al.

(10) Patent No.: US 12,568,049 B2
(45) Date of Patent: Mar. 3, 2026

(54) TRAFFIC POLICING DETECTION AND RATE LIMIT ESTIMATION FOR A NETWORK

(71) Applicant: Agora Lab, Inc., Santa Clara, CA (US)

(72) Inventors: Yichen Qian, Shanghai (CN); Zesen Zhuang, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 167 days.

(21) Appl. No.: 18/404,379

(22) Filed: Jan. 4, 2024

(65) Prior Publication Data

US 2025/0227068 A1     Jul. 10, 2025

(51) Int. Cl.
*H04L 47/20* (2022.01)
*H04L 43/022* (2022.01)
*H04L 43/0829* (2022.01)
*H04L 43/0882* (2022.01)
*H04L 43/0894* (2022.01)
*H04L 47/27* (2022.01)

(52) U.S. Cl.
CPC ............ *H04L 47/20* (2013.01); *H04L 43/022* (2013.01); *H04L 43/0835* (2013.01); *H04L 43/0882* (2013.01); *H04L 43/0894* (2013.01); *H04L 47/27* (2013.01)

(58) Field of Classification Search
None
See application file for complete search history.

(56) References Cited

U.S. PATENT DOCUMENTS 9,294,961 B2 * 3/2016 Meredith .......... H04W 28/0231
11,128,700 B2 * 9/2021 Rao ..................... H04L 41/0816
(Continued)

FOREIGN PATENT DOCUMENTS

EP     2237503 A1 * 10/2010 ............. H04L 47/70
EP     2247042 A1 * 11/2010 ............. H04L 43/04
(Continued)

OTHER PUBLICATIONS

WO 2020040060 A1 (Year: 2020).*
(Continued)

*Primary Examiner* — Sandarva Khanal
(74) *Attorney, Agent, or Firm* — Young Basile Hanlon & MacFarlane, P.C.

(57) ABSTRACT

Apparatus, method and non-transitory computer readable medium for traffic policing detection and rate limit estimation for a network, including selecting from the network sampled packets having a loss rate greater than a first threshold, the selected sampled packets being added to a sliding window for traffic policing detection; in response to the number of sampled packets in the sliding window reaching a predetermined number, determining a correlation coefficient based on a sending rate and the loss rate of at least one sampled packet in the sliding window; in response to the correlation coefficient exceeding a second threshold, determining whether traffic policing is occurring in the network based on the sending rate and a transformed loss rate of the at least one sampled packet; and in response to traffic policing occurring, determining an estimated rate limit for traffic policing based on an acknowledgement rate of the at least one sampled packet.

20 Claims, 6 Drawing Sheets

(56) References Cited

U.S. PATENT DOCUMENTS

| | | | | |
|---|---|---|---|---|
| 11,523,002 | B2 * | 12/2022 | Stepnioski | H04M 15/852 |
| 2007/0121596 | A1 * | 5/2007 | Kurapati | H04L 63/1458 |
| | | | | 370/356 |
| 2008/0037420 | A1 * | 2/2008 | Tang | H04L 69/163 |
| | | | | 370/231 |
| 2008/0043625 | A1 * | 2/2008 | Cohen | H04L 67/1042 |
| | | | | 370/236 |
| 2010/0274885 | A1 * | 10/2010 | Yoo | H04L 67/1008 |
| | | | | 709/224 |
| 2014/0169162 | A1 * | 6/2014 | Romano | A61B 5/0015 |
| | | | | 370/230 |
| 2015/0029864 | A1 * | 1/2015 | Raileanu | H04L 43/16 |
| | | | | 370/237 |
| 2017/0366467 | A1 * | 12/2017 | Martin | H04L 12/4625 |
| 2019/0372857 | A1 * | 12/2019 | Gandhi | H04L 41/5009 |
| 2023/0063243 | A1 * | 3/2023 | St. Pierre | H04L 47/2433 |
| 2024/0430206 | A1 * | 12/2024 | Zhao | H04L 47/2425 |

FOREIGN PATENT DOCUMENTS

| | | | | | |
|---|---|---|---|---|---|
| EP | | 2723021 | A1 * | 4/2014 | H04L 43/10 |
| WO | WO-2007127332 | A2 * | 11/2007 | H04L 67/104 |
| WO | WO-2009012811 | A1 * | 1/2009 | H04L 47/10 |

OTHER PUBLICATIONS

Flach T, Papageorge P, Terzis A, et al. An internet-wide analysis of traffic policing[C]//Proceedings of the 2016 ACM SIGCOMM Conference. 2016: 468-482.

QoS: Regulating Packet Flow Configuration Guide, Cisco IOS Release 15M American Headquarters; San Jose, CA; pp. 1-34; Feb. 20, 2013.

* cited by examiner

200

400

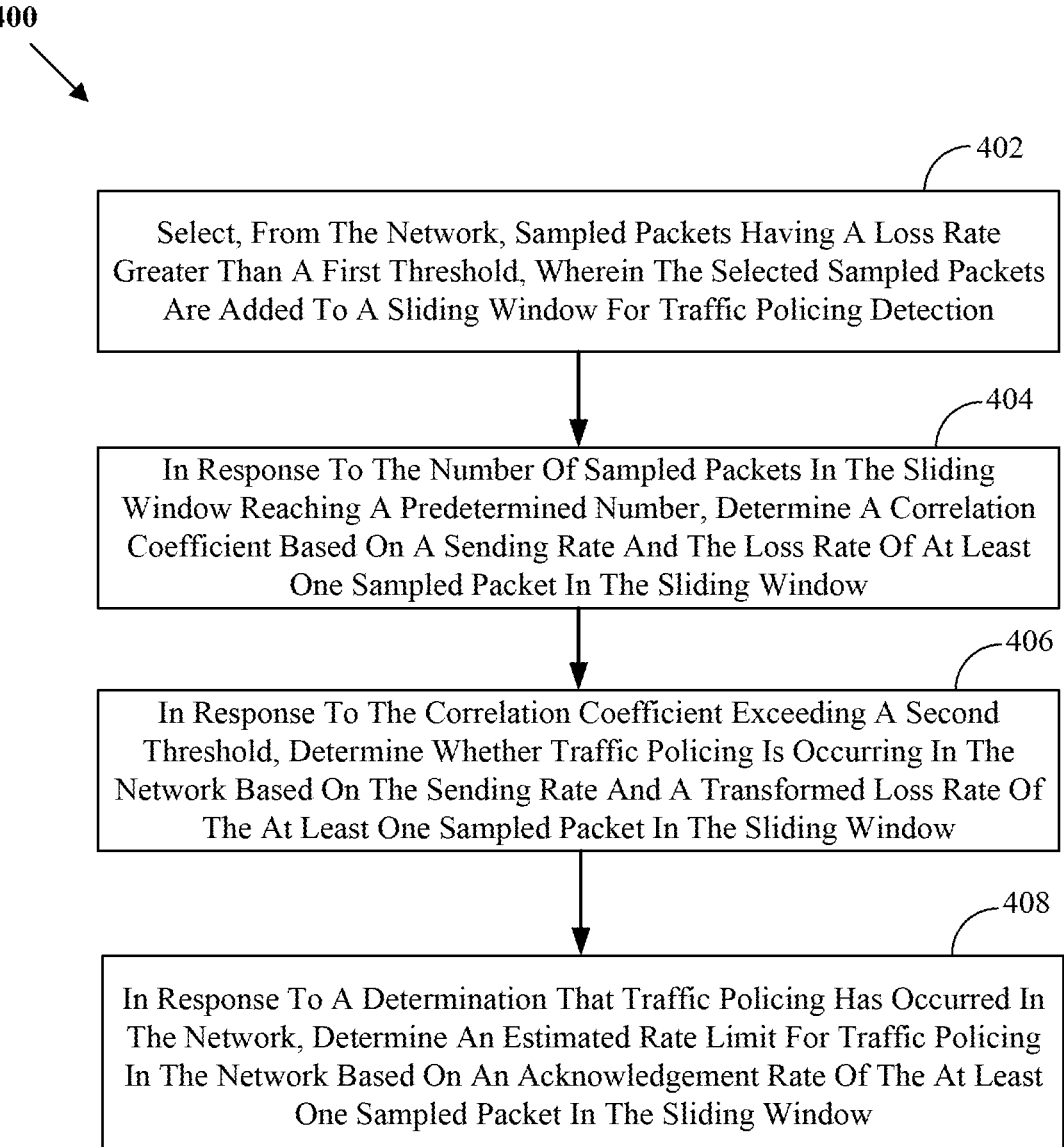

402

Select, From The Network, Sampled Packets Having A Loss Rate Greater Than A First Threshold, Wherein The Selected Sampled Packets Are Added To A Sliding Window For Traffic Policing Detection

404

In Response To The Number Of Sampled Packets In The Sliding Window Reaching A Predetermined Number, Determine A Correlation Coefficient Based On A Sending Rate And The Loss Rate Of At Least One Sampled Packet In The Sliding Window

406

In Response To The Correlation Coefficient Exceeding A Second Threshold, Determine Whether Traffic Policing Is Occurring In The Network Based On The Sending Rate And A Transformed Loss Rate Of The At Least One Sampled Packet In The Sliding Window

408

In Response To A Determination That Traffic Policing Has Occurred In The Network, Determine An Estimated Rate Limit For Traffic Policing In The Network Based On An Acknowledgement Rate Of The At Least One Sampled Packet In The Sliding Window

TRAFFIC POLICING DETECTION AND RATE LIMIT ESTIMATION FOR A NETWORK

TECHNICAL FIELD

This disclosure relates to communications, and in particular, to traffic policing detection and rate limit estimation for a network.

BACKGROUND

With the rapid development of networks and related applications, traffic transmitted in a network is becoming increasingly larger. For example, real-time multimedia (e.g., audio and/or video) communications have wide applications, such as conferences, live broadcasting, video chat sessions, webinars, and the like. As the number of communication sessions increases in a network, the total traffic on the network may approach or exceed the limit of a network, which typically has limited bandwidth.

To optimize network efficiency and provide better user experience, network operators can implement flow control mechanisms on intermediate nodes of the network, such as routers, to manage the flow of data within the network.

For example, traffic policing, which limits the rate at which data can be transmitted or received, can be implemented in the network through a token bucket and a mechanism to drop packets. The token bucket typically has a fixed capacity and the system adds tokens to the token bucket at a fixed rate. When sending (or routing) a packet over the network, a corresponding number of tokens are required to be obtained from the token bucket before the packet can be sent. If not enough tokens are available in the bucket, the packet will be dropped, and later packets will be dropped until a new token or several new tokens are generated.

SUMMARY

Disclosed herein are implementations of methods, apparatuses, and systems for traffic policing detection and rate limit estimation for a network.

A first aspect is a method for traffic policing detection and rate limit estimation for a network, including selecting, by a processor from the network, sampled packets having a loss rate greater than a first threshold, wherein the selected sampled packets are added to a sliding window for traffic policing detection; in response to the number of sampled packets in the sliding window reaching a predetermined number, determining, by the processor, a correlation coefficient based on a sending rate and the loss rate of at least one sampled packet in the sliding window; in response to the correlation coefficient exceeding a second threshold, determining, by the processor, whether traffic policing is occurring in the network based on the sending rate and a transformed loss rate of the at least one sampled packet in the sliding window; and in response to a determination that traffic policing is occurring in the network, determining, by the processor, an estimated rate limit for traffic policing in the network based on an acknowledgement rate of the at least one sampled packet in the sliding window.

A second aspect is an apparatus for traffic policing detection and rate limit estimation for a network that includes a memory and a processor. The processor is configured to execute instructions stored in the memory to select, from the network, sampled packets having a loss rate greater than a first threshold, wherein the selected sampled packets are added to a sliding window for traffic policing detection; in response to the number of sampled packets in the sliding window reaching a predetermined number, determine a correlation coefficient based on a sending rate and the loss rate of at least one sampled packet in the sliding window; in response to the correlation coefficient exceeding a second threshold, determine whether traffic policing is occurring in the network based on the sending rate and a transformed loss rate of the at least one sampled packet in the sliding window; and in response to a determination that traffic policing is occurring in the network, determine an estimated rate limit for traffic policing in the network based on an acknowledgement rate of the at least one sampled packet in the sliding window.

A third aspect is a non-transitory computer readable medium storing instructions operable to cause one or more processors to perform operations according to the method for traffic policing detection and rate limit estimation as described above.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 4 is a flowchart of an example technique for traffic policing detection and rate limit estimation.

DETAILED DESCRIPTION

Figure 1:
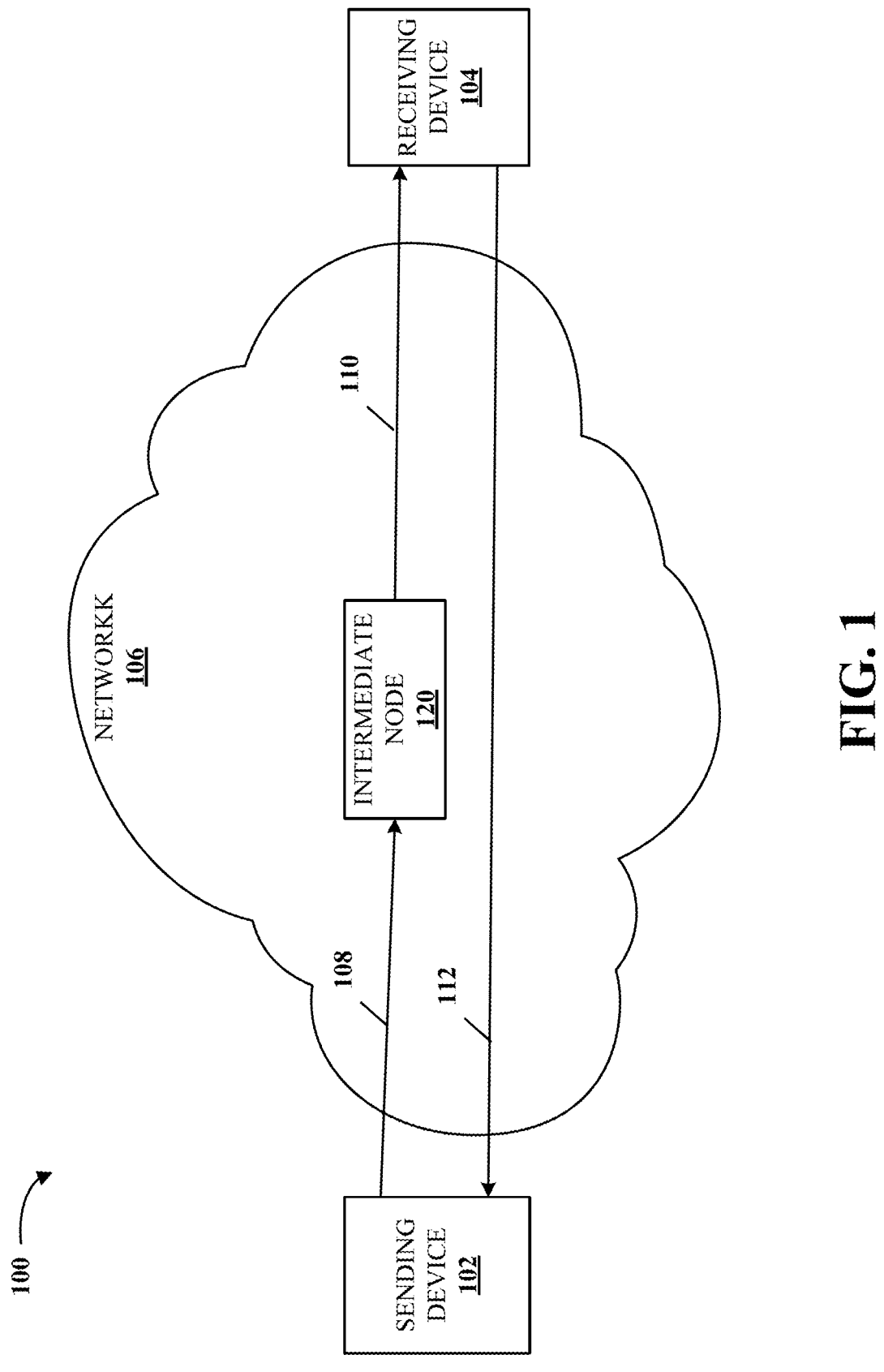
FIG. 1 is a diagram of an example of a system.

Flow control is crucial in preventing congestion, optimizing network performance, and ensuring efficient data transmission in a network. To optimize network efficiency and provide better user experience, network operators can implement flow control mechanisms on intermediate nodes of the network, such as routers, to manage the flow of data within the network.

Traffic policing, which limits the rate at which data can be sent or transmitted, can be implemented in the network through a token bucket and a mechanism to drop packets, as described above. When sending a packet over the network, a corresponding number of tokens are required to be obtained from the token bucket before the packet can be sent. If there are not enough tokens available in the token bucket, the packet will be dropped until a new token or several new tokens are generated. The tokens can be added to the token bucket at a flow limit rate, which can be set by the network operator according to, for example, the desired average outbound (egress) rate for limiting the network traffic.

If the generated tokens are not consumed in time, they will continue to accumulate, which can be consumed at once if sudden traffic arrives later. This allows traffic burst, which can exceed the rate limit for traffic policing for a short period of time, to pass through. The rate limit for traffic policing refers to the maximum allowable rate at which traffic is allowed to flow through a network node, such as an intermediate node, e.g., a router or switch. For example, the rate limit for traffic policing can correspond to the flow limit rate at which the tokens are added to the token bucket, as described above.

Due to the characteristics of traffic policing, there are problems associated with such a strategy. One such problem is that if the sending device has an inaccurate estimation of the rate limit for traffic policing, encoding bitrate and sending rate of real-time multimedia sessions can exceed the rate limit for traffic policing, which can cause packets being dropped due to traffic policing, which can lead to packet loss and reduction of Quality of Experience (QOE). Because traffic policing allows traffic bursts that can exceed the rate limit, it can be difficult to accurately estimate the rate limit of traffic policing during such traffic bursts.

Another problem is that for communication services that require retransmissions, packet loss will trigger retransmission, which can further increase data transmitted in the network and cause even more significant packet loss under traffic policing. This sometimes leads to retransmission storms, which causes lower transmission efficiency.

For a sending device, there remain some challenges to detect the existence of traffic policing in the network, and to accurately estimates the rate limit during traffic policing, while performing bandwidth estimation. A major challenge is that there are many intermediate nodes in the transmission, and other factors can lead to packet loss besides traffic policing. For example, packet loss can be due to random loss in the transmission. For the sending device, it is difficult to effectively distinguish packet loss due to traffic policing and packet loss due to other factors such as random loss.

Another challenge is that when the sending bitrate is below the rate limit for traffic policing, it is almost impossible to detect whether a link during transmission has a traffic policing strategy.

An additional challenge is that techniques that use "active" detection methods to detect traffic policing can generate additional network traffic overhead and may be blocked by the network operators.

Implementations according to this disclosure address these problems and challenges using "passive" traffic policing detection and rate limit estimation without generating additional network traffic overhead, among other things.

According to implementations of this disclosure, information regarding data packets that are sent and acknowledged ("ACKed") are used to sample the sending rate, ACK rate and packet loss rate. Samples are filtered by the packet loss rate. Then a correlation between the filtered sending rate and a transformed packet loss rate is determined. When the sending rate exceeds the rate limit (for traffic policing), the extra packets will be dropped due to traffic policing. Therefore, the higher the sending rate, the higher the packet loss will be. Based on this distinction, a correlation coefficient, such as a Pearson correlation coefficient, can be determined between the sending rate(s) and the transformed packet loss rate(s). Further, samples with high correlations within a sliding window can be used to determine whether traffic policing is occurred. A linear fitting of the highly correlated sending rates and the transformed packet loss rates can be performed, and the intercept of the linear fitting can be used to distinguish between two different packet loss scenarios: packet loss due to traffic policing, and random packet loss, which would further decrease the false positive rate of traffic policing detection. The average of the ACK rates (of the receiver side) in the sliding window can be used to estimate the rate limit for traffic policing, which can be applied to congestion control algorithms in the network to adjust bandwidth estimation (BWE).

Implementations of this disclosure can work with all types of congestion control algorithms based on bandwidth sampling, and will not affect the congestion control algorithms during the traffic policing detection phase. No additional traffic is required. The traffic policing detection phase can be adjusted according to the requirement of computational cost, which makes it easy to control and adapt.

Further details of traffic policing detection and rate limit estimation for a network are described herein with initial reference to a system in which it can be implemented.

FIG. 1 is a diagram of an example of a system 100 for a system. The system 100 includes multiple devices or apparatuses, such as user devices (e.g., a sending device 102 and a receiving device 104), which communicate (e.g., send and receive multimedia content) via intermediate nodes (e.g., an intermediate node 120) of a network 106. The intermediate node 120 can include any node on a communication path within the network 106 between the sending device 102 and the receiving device 104. For example, the intermediate node 120 can include a server, a control node, a service node, an edge node (also referred to as an edge server), etc. The control node, for example, can be used for controlling the network traffic. While FIG. 1 shows only a certain number of user devices, intermediate nodes, and networks, as can be appreciated, more or fewer of each can be included in the system 100. Traffic policing can occur at one or more of the intermediate nodes, such as the intermediate node 120 of the network 106.

In some implementations, the system 100 can be implemented using general-purpose computers with a computer program that, when executed, carries out the methods, algorithms, processes, and/or instructions described herein. It should be noted that parts or components of the computing device 200 of FIG. 2 can include elements not limited to those shown in FIG. 2.

Each of the user devices 102 and 104, and the intermediate node 120 can be implemented by or can be any number of any configuration of computers, such as a microcomputer, a mainframe computer, a supercomputer, a general-purpose computer, an integrated computer, a database computer, or a remote server computer. A user device of the user devices 102 and 104 can be any end-user device capable of multimedia communications such as a smartphone, a camera, a desktop computer, a laptop computer, a workstation computer, a tablet computer, a cell phone, a personal data assistant (PDA), a wearable computing device, or a computing device provided by a computing service provider (e.g., a web host or a cloud service provider). Each or some of the user devices 102 and 104, and the intermediate node 120 can have a hardware configuration as shown by the computing device 200 of FIG. 2. However, other configurations are possible.

The network 106 can be any combination of any suitable type of physical or logical networks, such as a wireless network, a wired network, a local area network (LAN), a wide area network (WAN), a virtual private network (VPN), a cellular data network, a Bluetooth network, an infrared connection, an NFC connection, or the Internet. The network 106 can be considered to be an infrastructure for facilitating (e.g., enabling, carrying out, etc.) media sessions. The network 106 can include many other components other than those described below. For example, the network 106 can include components or services for signaling, network address translation (NAT), firewall traversal, identity verification, routing, and the like.

The intermediate nodes of the network 106, such as the intermediate node 120, can be interconnected with each other. The intermediate nodes of the network 106, such as the intermediate node 120, can also be connected to user devices, such as the user devices 102 and 104 as shown in FIG. 1. An intermediate node directly connected to a user device can be referred to as an "edge server."

In this disclosure, the term "directly connected" refers to establishing a connection between a first node and a second node in a network via no intermediate, routing, or forwarding node(s). That is, the direct connection can cause data to be sent and received between the first node and the second node without assistance or facilitation of any other node of the network. It should be noted that the "direct connection" is at the application level of the network, and establishing the "direct connection" does not exclude using assistant or facilitating apparatuses or devices, such as a gateway, a router, a switchboard, or any other routing or forwarding devices or apparatuses that do not function as application-level nodes of the network.

The intermediate nodes can receive, forward, and deliver multimedia data (such as data of media sessions) from and to different user devices. Some connections between the nodes can be bidirectional. Some other connections between the nodes can be unidirectional. In some implementations, an intermediate node can switch between roles of an edge node and a router node at different time, or function as both at the same time.

For example, instead of connecting through the intermediate node 120, the user devices 102 and 104 may be connected directly via a connection 112 from the user device 104 to the user device 102. In another example, the user devices 102 and 104 may be connected to each other through the intermediate node 120 via a first connection 108 from the sending device 102 to the intermediate node 120, and a second connection 110 from the intermediate node 120 to the receiving device 104, either of which can be direct or indirect. It is understood that FIG. 1 is just an illustrative example and any type of connections is possible between the user devices, directly or indirectly.

The network 106 may be implemented on an application layer of a computing network. For example, in a TCP/IP model, a computer-communications network may be partitioned into multiple layers. For example, in a hierarchical order from bottom to top, the multiple layers may include a physical layer, a network layer, a transport layer, and an application layer. Each of the foregoing layers may serve the layer above it and may be served by the layer below it. The application layer may be the TCP/IP layer that directly interacts with an end user with software applications. The network 106 may be implemented as application-layer software modules. In addition, part or all of the network 106 may be a public network (e.g., the Internet). In other words, the data traffic of the network 106 may be partially routed through the public network.

Figure 2:
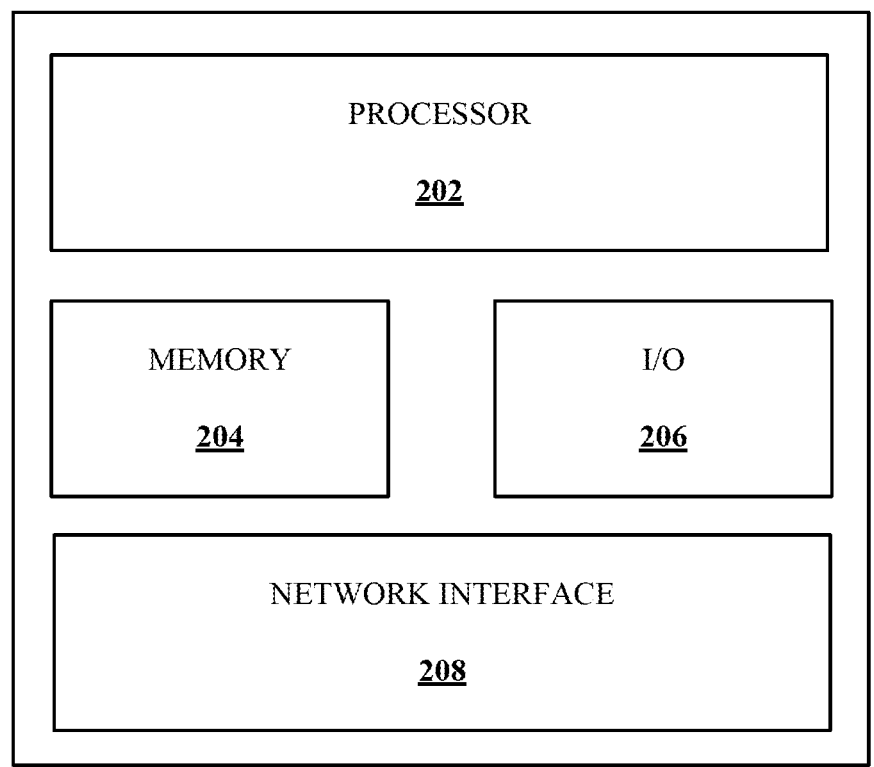
FIG. 2 is an example computing device.

FIG. 2 is an example of a computing device 200. The computing device 200 can include a processor 202, a memory 204, an input/output (I/O) device 206, and a network interface 208.

The processor 202 can be any type of device capable of manipulating or processing information. In some implementations, the processor 202 can include a central processor (e.g., a central processing unit or CPU). In some implementations, the processor 202 can include a graphics processor (e.g., a graphics processing unit or GPU). Although a single processor is shown, the computing device 200 can use multiple processors. For example, the processor 202 can include multiple processors distributed across multiple machines (each machine having one or more processors) that can be directly coupled or indirectly connected via a network (e.g., a local area network).

The memory 204 can include any transitory or non-transitory device capable of storing codes and data that can be accessed by the processor (e.g., via a bus). The memory 204 herein can be a random-access memory (RAM), a read-only memory (ROM), an optical/magnetic disc, a hard disk, a solid-state drive, a flash drive, a security digital (SD) card, a memory stick, a compact flash (CF) card, or any combination of any suitable type of storage device. In some implementations, the memory 204 can be distributed across multiple machines, such as in the case of a network-based memory or cloud-based memory. The memory 204 can store data (not shown), an operating system (not shown), and one or more applications (not shown). The data can include any data for processing (e.g., an audio stream, a video stream, or a multimedia stream). The applications can include one or more programs that permit the processor 202 to implement instructions to generate control signals for performing functions of the techniques in the following description. An application can include or can be an encoder that encodes a media stream to be transmitted to another apparatus. An application can include or can be a decoder that receives a compressed media stream, decodes (i.e., decompresses) the compressed media stream and stores or displays the media stream at the computing device 200. An application can be or can include one or more techniques for calculating scaling factors of uplink bandwidths.

In some implementations, the computing device 200 can further include a secondary (e.g., external) storage device (not shown). The secondary storage device can provide additional memory when high processing needs exist. The secondary storage device can include any suitable non-transitory computer-readable medium, such as a memory card, a hard disk, a solid-state drive, a flash drive, or an optical disc. Further, the secondary storage device can be a component of the computing device 200 or a shared device accessible by the computing device 200 via a network. In some implementations, the application in the memory 204 can be stored in whole or in part in the secondary storage device and loaded into the memory 204 as needed for processing.

The I/O device 206 can be implemented in various ways. For example, the I/O device can include a display that coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The display can be a liquid crystal display (LCD), a cathode-ray tube (CRT), or any other output device capable of providing a visual output to an individual. The I/O device 206 can also be any device capable of receiving a visual, acoustic, or tactile signal from a user, such as a keyboard, a numerical keypad, a mouse, a trackball, a touch-sensitive device (e.g., a touchscreen), a sensor, a microphone, a camera, or a gesture-sensitive input device. In some cases, an output device can also function as an input device, such as a touchscreen display configured to receive touch-based input.

The network interface 208 can be used to communicate signals and/or data with another device (e.g., via a communication network, such as the network 106). For example, the network interface 208 can include a wired means for transmitting signals or data from the computing device 200 to another device. For another example, the network interface 208 can include a wireless transmitter or receiver using a protocol compatible to the wireless transmission. The network interface 208 can be implemented in various ways, such as a transponder/transceiver device, a modem, a router, a gateway, a system-on-chip (SoC), a wired (e.g., RJ-45) network adapter, a wireless (e.g., Wi-Fi) network adapter, a Bluetooth adapter, an infrared adapter, a near-field communications (NFC) adapter, a cellular network antenna, or any combination of any suitable type of device capable of providing functions of communications with the network 106. In some implementations, the network interface 208 can be a generic or general-purpose network interface that is not dedicated to a specialized network and not adapted to a specialized (e.g., closed-source, proprietary, non-open, or non-public) network protocol. For example, the network interface can be a general network interface that supports the Transmission Control Protocol/Internet Protocol (TCP/IP) communications protocol family (or "suite"). For another example, the network interface can be a general network interface that only supports the TCP/IP communications protocol family. It should be noted that the network interface 208 can be implemented in various ways and not limited to the aforementioned examples.

Without departing from the scope of this disclosure, the computing device 200 can include more or fewer of parts, components, hardware modules, or software modules for performing functions of real-time multimedia communications.

Figure 3:
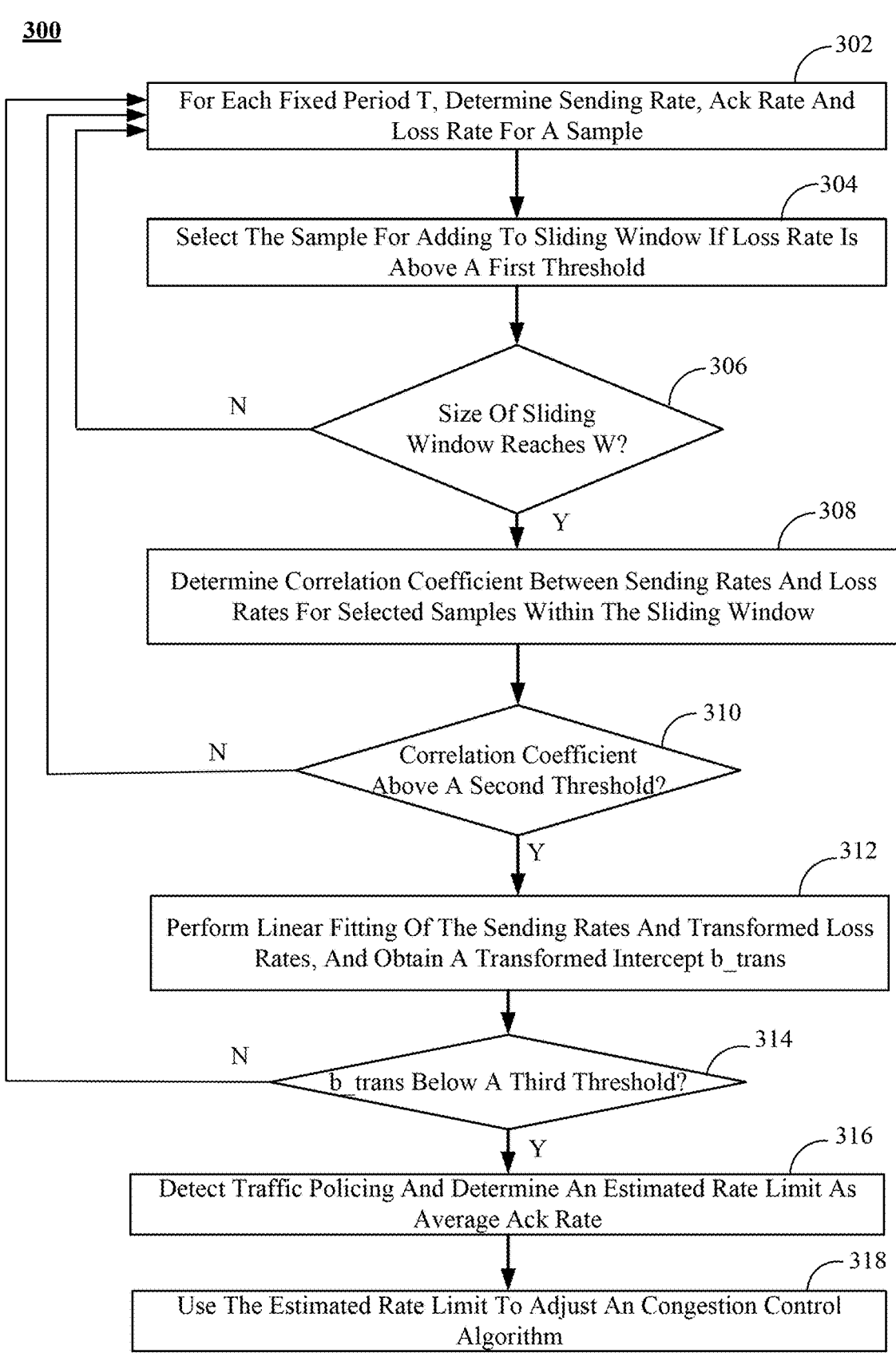
FIG. 3 is a flowchart of an example technique for traffic policing detection and rate limit estimation.

FIG. 3 is a flowchart of an example of a technique 300 for traffic policing detection and rate limit estimation for a network. The technique 300 can be implemented by a device, such as the sending device 102, that is connected to a network, such as the network 106, to participate in communication sessions (such as an audio or video communication). For example, a media stream captured and generated at the device can be encoded by an encoder (e.g., a video and/or an audio encoder) of the device (e.g., the sending device 102) for transmission, via the network, to one or more receiving devices ("receivers"), e.g., the receiving device 104. The technique 300 can be implemented, for example, at the network layer of the sending device 102 of FIG. 1.

The technique 300 can be implemented, for example, as a software program that may be executed a computing device, such as the sending device 102 or the computing device 200. The software program can include machine-readable instructions that may be stored in a memory such as the memory 204 or the secondary storage, and that, when executed by a processor, such as the processor 202, may cause the computing device to perform the technique 300. The technique 300 can be implemented using specialized hardware or firmware. Multiple processors, memories, or both, may be used.

At 302, the techniques 300 determines, for a fixed period T, a sending rate, an acknowledgement (ACK) rate and a loss rate for a sample. Information regarding sent and acknowledged ("ACKed") data packets are used to sample the sending rate, ACK rate and packet loss rate. The sample can include, for example, a data packet sampled from the network 106. For example, packets such as data packets can be periodically sampled from the network, such as the network 106. The periodically sampled packets can include packets that are sampled regularly or irregularly (e.g., randomly) at fixed time intervals, or packets that are sampled at time intervals set based on changing network conditions. The samples can be obtained or otherwise received by a user device such as the sending device 102, and can include, for example, packets that are transmitted during media sessions of respective connected devices (e.g., media sessions between user devices such as the sending device 102 and the receiving device 104).

For example, in some implementations, the sending rate can be determined according to the total bytes sent in a current sending sample period and a time interval of the current sending sample period. Sending samples refer to data packets that are sent, e.g., from a sending device to the network, that are sampled.

The time interval of the current sending sample period, which can be represented by $T_{send}$, can be determined based on a difference between the sent time (e.g., timestamps) of the latest ACKed packet, which can be represented by $send_{t2}$, and the last ACKed packet at the last sending sample period (prior to the current sending sample period), which can be represented by $send_{t1}$.

Figure 5:
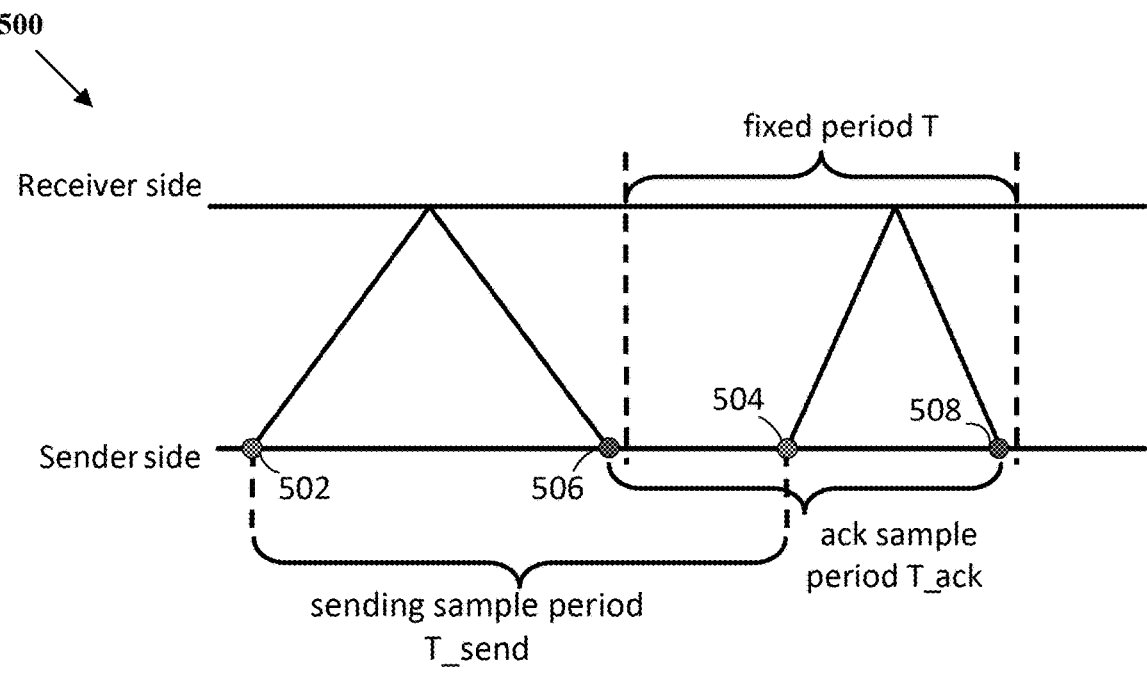
FIG. 5 is a diagram illustrating an example of determining a loss rate for a packet sample.

FIG. 5 is a diagram 500 illustrating an example of determining a loss rate for a packet sample. Referring to FIG. 5, "T_send" is an example time interval for current sending sample period, which can be determined as the difference between 504 and 502, which represent the sent times for the latest ACKed packet and the last ACKed packet in the last sending sample period, respectively.

For example, the total bytes sent in the current sending sample period can be represented by $total\_pkts\_sent_{intvl}$, which can be determined based on a difference between the total sent bytes counted when the latest ACKed packet is received in the current sending sample period, which can be represented by $total\_pkts\_sent_{t2}$, and the total sent bytes counted at the last sending sample period, which can be represented by $total\_pkts\_send_{t1}$. Referring to the example according to FIG. 5, $total\_pkts\_sent_{intvl}$ represents the total bytes sent in the current sending sample period "T_send", which is between 504 and 502.

The sending rate $send\_rate_{t2}$ can be determined by dividing the total bytes sent in the current sending sample period by the time interval of the current sending sample period, an example of which is as follow:

$$send\_rate_{t2} = \frac{total\_pkts\_sent_{intvl}}{T_{send}} \qquad \text{(Equation 1)}$$

The ACK rate can be determined using a similar logic as the sending rate. For example, the ACK rate can be determined according to the total bytes ACKed in a current ACK sample period and a time interval of the current ACK sample period. ACK samples refer to data packets that are ACKed, e.g., by a receiving device, that are sampled.

The time interval of the current ACK sample period, which can be represented by $T_{ack}$, can be determined based on a difference between the receiving times (e.g., timestamps) of the latest ACKed packet, which can be represented by $ack_{t2}$, and the last ACKed packet at the last ACK sample period, which can be represented by $ack_{t1}$. Referring to FIG. 5 as an example, "T_ack" is an example time interval for current ACK sample period, which can be determined as the difference between 508 and 506, which represent the receiving times (at the sender side) for the latest ACKed packet and the last ACKed packet in the last ACK sample period, respectively.

For example, the total bytes ACKed in the current ACK sample period can be represented by $\text{total\_pkts\_ack}_{intvl}$, which can be determined based on a difference between the total ACKed bytes counted when the latest ACKed packet is received in the current ACK sample period, which can be represented by $\text{total\_pkts\_ack}_{t2}$, and the total ACKed bytes counted at the last ACK sample period, which can be represented by $\text{total\_pkts\_ack}_{t1}$.

The ACK rate $\text{ack\_rate}_{t2}$ can be determined by dividing the total bytes ACKed in the current ACK sample period by the time interval of the current ACK sample period, an example of which is as follow:

$$\text{ack\_rate}_{t2} = \frac{\text{total\_pkts\_ack}_{intvl}}{T_{ack}} \qquad \text{(Equation 2)}$$

The loss rate, also referred to as the packet loss rate, can be determined using the difference between the total bytes sent in the current sending sample period and the total bytes ACKed in the current ACK sample period. For example, the loss rate can be determined as follows:

$$\text{loss\_rate}_{t2} = \frac{\text{total\_pkts\_sent}_{intvl} - \text{total\_pkts\_ack}_{intvl}}{\text{total\_pkts\_sent}_{intvl}} \qquad \text{(Equation 3)}$$

Variations or other ways can also be used to determine the sending rate, the ACK rate and the loss rate without using the example(s) above.

At 304, the technique 300 selects the sample if the loss rate determined at 302 is greater than a first threshold. The first threshold can be denoted as $\delta_l$. The first threshold can have a numerical value that is close to 0. For example, the first threshold can be set as 0.01 or even smaller value. The purpose of this threshold is to filter out the samples whose sending rates are below the rate limit for traffic policing, therefore no (or little) loss is cause by traffic policing. Theses samples may affect subsequent judgments. The selected sample can be added to a sliding window. For the selected sample added to the sliding window, the sending rate, ACK rate, and the loss rate of the selected sample, which are determined at 302, can be used for correlation determination at 306.

For example, in some implementations, the technique 300 can initiate an empty sliding window. For every fixed period T, the samples selected at 304 can be added to the sliding window. When the number of samples in the sliding window exceeds W (which can be a fixed number or set based on network conditions etc), the earliest sample in the sliding window is removed to ensure that the number of samples in the sliding window remains at W.

Other window-based variations or other mechanisms can also be used to collect the selected samples without using the sliding window as described above.

At 306, the technique 300 determines if the size of the sliding window, i.e., the number of selected samples for correlation determination, reaches W. If so, at 308, the technique 300 proceeds to determine a correlation coefficient between the sending rates and the loss rates for the samples in the sliding window at 308. If the size of the sliding windows is still below W, the technique 300 returns to 302 to determine the forementioned rates for more samples.

Under the traffic policing scenario, the queuing delays of the data packets are usually short. Therefore, the time intervals of the sending sample period and the ACK sample period $T_{send}$ and $T_{ack}$, as also seen in the example of FIG. 5, tend to be close to equal. Therefore, based on the assumption that $T_{send}$ and $T_{ack}$ tend to be the approximately the same, both the numerator and the denominator on the right side of Equation 3 can be divided by $T_{send}$, and the sending rate and the loss rate of a sample can be considered to conform to a numerical relationship indicated by the following equation:

$$\text{send\_rate}_{t2} = \frac{\text{ack\_rate}_{t2}}{1 - \text{loss\_rate}_{t2}} \qquad \text{(Equation 4)}$$

Since the rate limit for traffic policing is usually fixed, the ACK rate ack_rate can be regarded as a constant. Based on Equation 4, it can be determined that the sending rate send_rate is positively correlated with $1/(1-\text{loss\_rate})$. From this, a transformed loss rate, which is used to determine a correlation coefficient, can be determined by:

$$\text{loss\_trans}_i = 1/(1 - \text{loss\_rate}_i) \qquad \text{(Equation 5)}$$

wherein $\text{loss\_trans}_i$ represents the transformed loss rate of the i-th sample, and $\text{loss\_rate}_i$ represents the loss rate of the i-th sample.

The correlation coefficient can be a Pearson correlation coefficient. For example, the correlation coefficient can be determined between the transformed loss rate and the sending rate as follows:

$$r = \frac{\sum_{i=1}^{W}(\text{send\_rate}_i - \overline{\text{send\_rate}})(\text{loss\_trans}_i - \overline{\text{loss\_trans}})}{\sqrt{\sum_{i=1}^{W}(\text{send\_rate}_i - \overline{\text{send\_rate}})^2}\sqrt{\sum_{i=1}^{W}(\text{loss\_trans}_i - \overline{\text{loss\_trans}})^2}} \qquad \text{(Equation 6)}$$

wherein r represents the correlation coefficient, send_rate; represents the sending rate of the i-th sample, $\overline{\text{send\_rate}}$ is the average of the sending rates within the sliding window and $\overline{\text{loss\_trans}}$ is the average of the transformed loss rates within the sliding window.

At 310, the technique 300 determines if the correlation coefficient is above a second threshold. The second threshold can be denoted as $\delta_r$. The second threshold can have a numerical value that is close to 1 to obtain the samples with high correlation. For example, the threshold can be set as 0.9 or even larger value. If the correlation coefficient exceeds $\delta_r$, at 312, the technique 300 performs linear fitting of the sending rates and the transformed loss rates of the samples in the sliding window, from which an intercept b is obtained. This would help to distinguish packet loss due to traffic policing from packet loss due to random loss.

In the random loss scenario, the sending rate send_rate can be expressed as the sum of an application bitrate $\text{send\_rate}_a$ and a retransmission bitrate $\text{send\_rate}_r$, where the retransmission bitrate is positively correlated with the transformed loss rate, as follows:

$$\text{send\_rate} = \text{send\_rate}_a + k' * \text{loss\_trans} \qquad \text{(Equation 7)}$$

US 12,568,049 B2

11

Figures 7A, 7B:
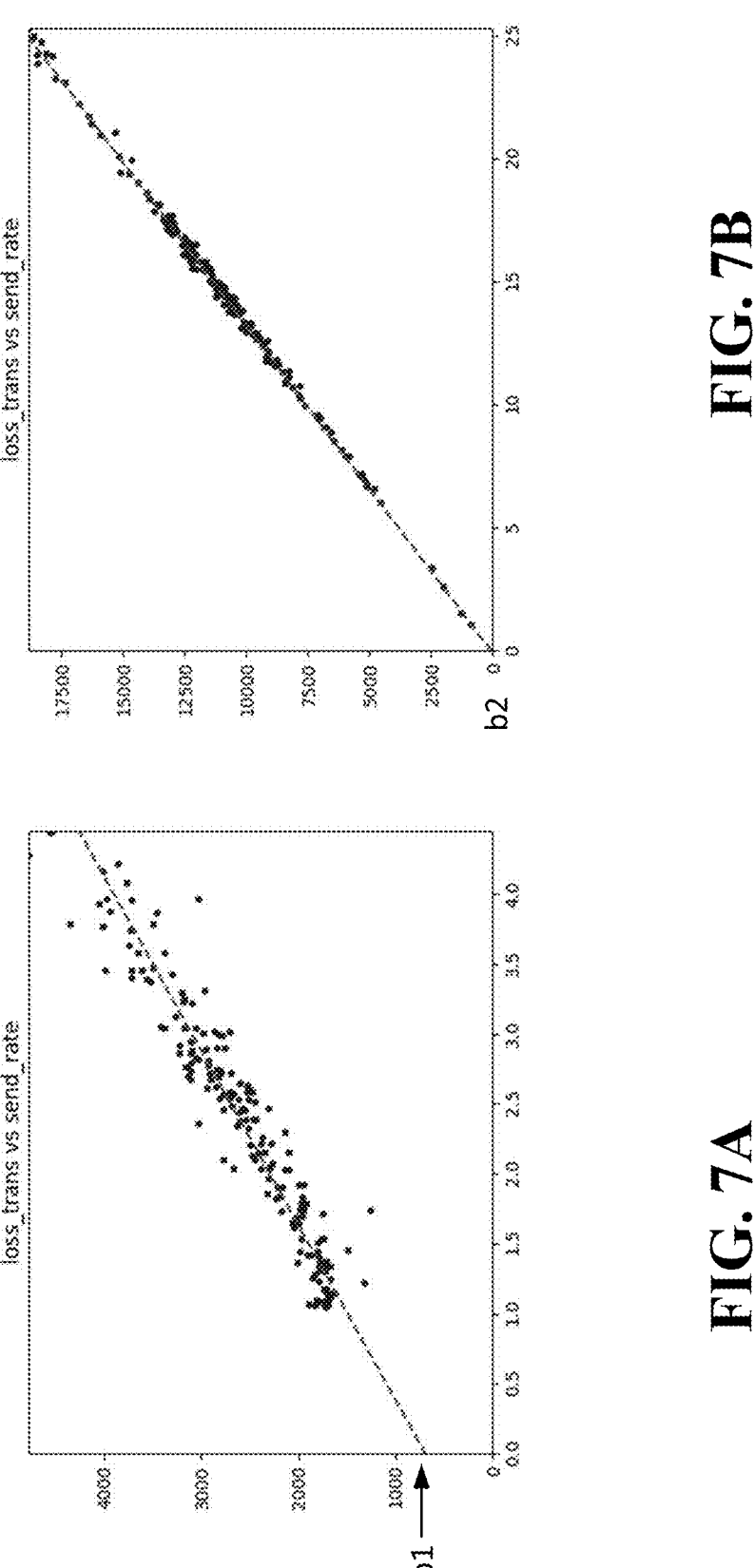
FIG. 7A is a diagram illustrating an example of linear fitting that results in a determination that traffic policing is occurring in the network.
FIG. 7B is a diagram illustrating an example of linear fitting that results in a determination that no traffic policing is occurring in the network.

By comparing Equation 7 with Equation 4, it can be seen that in the traffic policing scenario, the linear fitting of the sending rates and the transformed loss rates will pass through the (0,0) coordinate. That is, the intercept b≈0. FIG. 7B shows an example of linear fitting for the traffic policing scenario, which is based on actual data collected in an experiment, in which the intercept b2 as a result of the linear fitting is shown as approximately 0. Meanwhile, in the random loss scenario, the linear fitting of the sending rates and the transformed loss rates will have an intercept b≈send_rate$_a$. FIG. 7A shows an example of the random loss scenario, in which the intercept b1 as a result of the linear fitting is shown as well above 0. As shown by the examples in FIGS. 7A and 7B, the intercept b from linear fitting can be used to distinguish the traffic policing scenario from the random loss scenario, so as to more accurately determine whether or not traffic policing is occurring in the network.

There are various ways to determine the intercept b. For example, the intercept b and the slope k can be determined as follows:

$$k = \frac{\sum_{i=1}^{W}(\text{send\_rate}_i - \overline{\text{send\_rate}})(\text{loss\_trans}_i - \overline{\text{loss\_trans}})}{\sum_{i=1}^{W}(\text{loss\_trans}_i - \overline{\text{loss\_trans}})^2}$$ (Equation 8)

$$b = \overline{send_{rate}} - k * \overline{loss_{trans}}$$ (Equation 9)

It should be understood that Equations 8 and 9 are just examples. Other ways can also be used to determine the intercept b (or the slope k) using linear fitting, which are not limited to Equations 8 and 9. Also, variations or alternatives to linear fitting can also be used, such as, for example, various regression techniques. There are various ways to distinguish the traffic policing scenario from the random loss scenario using the intercept b. For example, one consideration is that in the random loss scenario, both the intercept b and the slope k are close to or at least on the same order of magnitude as the application bitrate, which can be varied in different scenarios. Therefore, a transformed intercept b_trans can be determined by:

$$b\_trans = b/k$$ (Equation 10)

wherein b and k can be obtained by Equation 9. Using the transformed intercept b_trans can help to define a more uniform threshold that works for very different application bitrate scenarios, which will be discussed further below. It is also possible to use the intercept b without transformation, as long as the threshold for the intercept is set in a way to distinguish between the random loss and the traffic policing scenarios.

At 314, the technique 300 determines if the transformed intercept b_trans is below an intercept threshold. The intercept threshold can be denoted as δ$_b$. The intercept threshold can have a numerical value that is close to 0. For example, the threshold can be set as 0.1 or even smaller value. If the transformed intercept b is below the intercept threshold, at 316, the technique 300 determines that traffic policing is occurring ("traffic policing is detected") and the estimated rate limit for traffic policing can be determined as an average of the ACK rates of the samples within the sliding window. As previously discussed, it is also possible to compare the intercept b, without transformation, with the intercept threshold, as long as the intercept threshold is set to a value that can distinguish between the random loss and the traffic policing scenarios.

For example, the estimated rate limit for traffic policing can be determined as follows:

$$bw_{policing} = \frac{\sum_{i=1}^{W}\text{ack\_rate}_i}{W}$$ (Equation 11)

The estimated rate limit for traffic policing, denoted as bw$_{policing}$, can be used at 318 to adjust the bandwidth estimation (BWE) of the congestion control algorithm in the system, such as the system 100. the sending rate in the network with detected traffic policing to allow smoother flow control and prevent packet loss.

Figure 6:
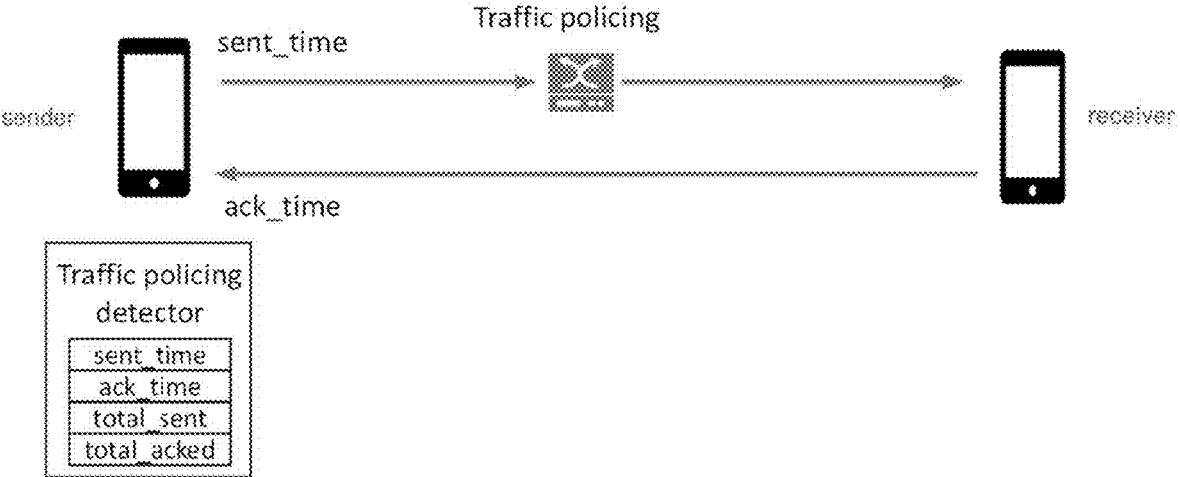
FIG. 6 is a diagram illustrating an example traffic policing detector at a sending device.

In an illustrative example according to FIG. 6, a traffic policing detector can be implemented at a sending device to determine whether traffic policing is occurring in the network. The traffic policing detector can be implemented by the sending device such as the sending device 102 of FIG. 1. The traffic policing detector can be implemented, for example, according to one or more operations of the technique 300 described above, or according to one or more operations of a technique 400, which will be described below. The traffic policing detector can have input parameters such as, for example, send_time, ack_time, total_sent, and total_acked, and the output can include, for example, a determination of whether traffic policing is occurring in the network, the estimated rate limit, an adjusted congestion control algorithm, or a combination of the above. The parameter send_time can be used to indicate the time (e.g., timestamp) at which a packet (e.g., a data packet L) that is the latest one to be ACKed, is sent from a sending device to a receiving device in a network. The parameter ack_time can be used to indicate the time (e.g., timestamp) at which an acknowledgment (ACK) of the data packet L is received by the sending device, confirming the successful receipt of the data packet L by the receiving device. The parameters send_time and ack_time can be used to determine the time intervals T$_{send}$ and T$_{ack}$ for the current sample period, respectively, as described above at 302. For example, the time interval for the current sending sample period can be determined using the difference between the value of the parameter send_time of the current sending sample period and that of the last sending sample period. The parameter ack_time can be determined in a similar way. As described above, the parameters total_sent and total_acked can be used to indicate the total bytes of packets sent or acknowledged in the current (e.g., sending or ACK) sample period, respectively. Then the various rates such as the sending rate, the ACK rate and the loss rate can be determined according to 302, and so on.

FIG. 4 is a flowchart of an example of the technique 400 for traffic policing detection and rate limit estimation for a network. The technique 400 may be similar to, or based upon, the technique 300 of FIG. 3. Without repeating every detail already described in the technique 300, the technique 400 is described below with reference to the technique 300 and the examples therein. The technique 400 can be implemented as software and/or hardware modules in the system 100 in FIG. 1. For example, the technique 400 can be implemented as software modules of a sending device, such as the sending device 102 of FIG. 1. For another example, the software modules implementing the technique 400 can be stored in a memory, such as the memory 204 of FIG. 2 and which can be the memory of the sending device 102, as instructions and/or data executable by a processor, such as the processor 202 of FIG. 2 and which can be a processor of the sending device 102. For example, the technique 400 can be executed when communications (such as an audio or video communication) occur between two user devices, such as the sending device 102 and the receiving device 104 in FIG. 1. For another example, the technique 400 may be implemented in hardware as a specialized chip storing instructions executable by the specialized chip.

In some implementations, the technique 400 can include obtaining sampled packets (e.g., bandwidth samples), which can include packets that are periodically sampled from the network, such as the network 106. The periodically sampled packets can include packets that are sampled regularly or irregularly (e.g., randomly) at fixed time intervals, or packets that are sampled at time intervals set based on changing network conditions. The bandwidth samples can be obtained by a user device such as the sending device 102, and can include, for example, packets that are transmitted during communication sessions of respective connected devices (e.g., media sessions between user devices such as the sending device 102 and the receiving device 104). As used in this disclosure, "obtain" can mean to form, produce, select, identify, construct, determine, receive, specify, generate, or other obtain in any manner whatsoever.

At 402, the technique 300 includes selecting, from the network, sampled packets having a loss rate greater than a first threshold, and adding the selected sampled packets to a sliding window for traffic policing detection.

In some implementations, the loss rate of a sampled packet can be determined using the total bytes of packets that are sent and received in the current sampling period. The loss rate, along with the sending rate, ACK rate described below, can be determined similar to 302. For example, similar to Equation 3, the loss rate of the sampled packet can be determined based on the results of the following equation:

$$loss\_rate = \frac{total\_pkts\_sent_{intvl} - total\_pkts\_ack_{intvl}}{total\_pkts\_sent_{intvl}} \quad \text{(Equation 12)}$$

wherein $total\_pkts\_sent_{intvl}$ represents total bytes sent in a current sampling period, $total\_pkts\_ack_{intvl}$ represents total bytes acknowledged in the current sampling period, intvl represents the time interval of the current sampling period, and loss_rate represents the loss rate of the sampled packet.

At 404, in response to the number of sampled packets in the sliding window reaching a predetermined number, the technique 400 includes determining a correlation coefficient based on a sending rate and the loss rate of at least one sampled packet in the sliding window.

In some implementations, the correlation coefficient can be determined based on the sending rate and the loss rate of each sampled packet in the sliding window.

In some implementations, the correlation coefficient can be a Pearson correlation coefficient.

In some implementations, the correlation coefficient can be determined based on the results of Equation 6.

The predetermined number can be, for example, W as described in 304.

Similar to 306, in some implementations, the sending rate and the loss rate determined for the sampled packet conform to a numerical relationship indicated by the following equation:

$$send\_rate = \frac{ack\_rate}{1 - loss\_rate} \quad \text{(Equation 13)}$$

wherein send_rate and ack_rate represent the sending rate and the ACK rate of the sampled packet, respectively.

In some implementations, the transformed loss rate of an i-th sample in the sliding window can be determined based on the results of Equation 5.

In some implementations, in response to the number of sampled packets in the sliding window exceeding the predetermined number, the technique 400 further includes removing a sampled packet having the earliest timestamp from the sliding window until the number of the sampled packets in the sliding window is at the predetermined number, before determining the correlation coefficient at 404.

At 406, in response to the correlation coefficient determined at 404 exceeding a second threshold, the technique 400 includes determining whether traffic policing is occurring in the network based on the sending rate and a transformed loss rate of the at least one sampled packet in the sliding window.

In some implementations, whether traffic policing is occurring in the network can be determined based on the sending rate and the transformed loss rate of each sampled packet in the sliding window.

In some implementations, whether traffic policing is occurring in the network can be determined by linear fitting the sending rates and the transformed loss rates in the sliding window, which can include, for example, determining an intercept by linear fitting the sending rate and the transformed loss rate of each sampled packet in the sliding window, and determining whether traffic policing is occurring in the network based on the intercept. Similar to 310, the intercept can be determined from a slope, which can be determined from the send rates and the loss rates, as indicated by Equations 8 and 9 respectively, or in other ways.

In some implementations, in response to a determination that the transformed intercept is within a third threshold, the technique 400 includes determining that traffic policing is occurring in the network. In response to a determination that the transformed intercept exceeds the third threshold, the technique 400 includes determining that no traffic policing is occurring in the network. The third threshold can have a numerical value that is close to 0. For example, the threshold can be set as 0.1 or even smaller value.

At 408, in response to a determination at 406 that traffic policing is occurring in the network, the technique 400 includes determining an estimated rate limit for traffic policing in the network based on an acknowledgement rate of the at least one sampled packet in the sliding window.

In some implementations, the estimated rate limit for traffic policing in the network can be determined based on the acknowledgement rate of each sampled packet in the sliding window.

In some implementations, the estimated rate limit for traffic policing can be determined by an average of the acknowledgement rates for all sampled packets in the sliding window. For example, the estimated rate limit for traffic policing can be determined according to Equation 10 at 316.

In some implementations, in response to the determination that traffic policing is occurring in the network at 406 and after determining the estimated rate limit for traffic policing at 408, the technique 400 includes adjusting bandwidth estimation (BWE) for congestion control in the network based on the estimated rate limit for traffic policing.

Without repeating the details, the examples described above in connection with FIGS. 5, 6, 7A and 7B can also be used as examples for illustrating the technique 400 and its operations.

As described above, a person skilled in the art will note that all or a portion of the aspects of the disclosure described herein can be implemented using a general-purpose computer/processor with a computer program that, when executed, carries out any of the respective techniques, algorithms, and/or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), field-programmable gate arrays (FPGAs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of traffic policing detection and rate limit estimation for a network, comprising:
    selecting, by a processor from the network, sampled packets having a loss rate greater than a first threshold, wherein the selected sampled packets are added to a sliding window for traffic policing detection;
    in response to a number of sampled packets in the sliding window reaching a predetermined number, determining, by the processor, a correlation coefficient based on a sending rate and the loss rate of at least one sampled packet in the sliding window;
    in response to the correlation coefficient exceeding a second threshold, determining, by the processor, whether traffic policing is occurring in the network based on the sending rate and a transformed loss rate of the at least one sampled packet in the sliding window; and
    in response to a determination that traffic policing is occurring in the network, determining, by the processor, an estimated rate limit for traffic policing in the network based on an acknowledgement rate of the at least one sampled packet in the sliding window, and adjusting bandwidth estimation (BWE) for congestion control in the network based on the estimated rate limit for traffic policing.

2. The method of claim 1, wherein at least one of:
    the correlation coefficient is determined based on the sending rate and the loss rate of each sampled packet in the sliding window;

whether traffic policing is occurring in the network is determined based on the sending rate and the transformed loss rate of each sampled packet in the sliding window; or
    the estimated rate limit for traffic policing in the network is determined based on the acknowledgement rate of each sampled packet in the sliding window.

3. The method of claim 1, wherein determining, by the processor, whether traffic policing is occurring in the network based on the sending rate and the transformed loss rate of at least one sampled packet in the sliding window comprises:
    determining, by the processor, an intercept by linear fitting the sending rate and the transformed loss rate of the at least one sampled packet in the sliding window; and
    determining, by the processor, whether traffic policing is occurring in the network based on the intercept.

4. The method of claim 3, wherein determining, by the processor, whether traffic policing is occurring in the network based on the intercept comprises:
    in response to a determination that a transformed intercept is within a third threshold, determining that traffic policing is occurring in the network, wherein the transformed intercept is determined from the intercept; and
    in response to a determination that the transformed intercept exceeds the third threshold, determining that no traffic policing is occurring in the network.

5. The method of claim 1, wherein the loss rate of a sampled packet is determined based on a result of an equation expressed as:

$$\mathrm{loss\_rate} = \frac{\mathrm{total\_pkts\_sent}_{intvl} - \mathrm{total\_pkts\_ack}_{intvl}}{\mathrm{total\_pkts\_sent}_{intvl}}$$

wherein $\mathrm{total\_pkts\_sent}_{intvl}$ represents total bytes sent in a current sampling period, $\mathrm{total\_pkts\_ack}_{intvl}$ represents total bytes acknowledged in the current sampling period, and $\mathrm{loss\_rate}$ represents the loss rate of the sampled packet.

6. The method of claim 5, wherein the sending rate and the loss rate of the sampled packet conform to a numerical relationship indicated by:

$$\mathrm{send\_rate} = \frac{\mathrm{ack\_rate}}{1 - \mathrm{loss\_rate}}$$

wherein $\mathrm{send\_rate}$ and $\mathrm{ack\_rate}$ represent the sending rate and the acknowledgement rate of the sampled packet respectively.

7. The method of claim 1, wherein the transformed loss rate of an i-th sample in the sliding window is determined based on a result of an equation expressed as:

$$\mathrm{loss\_trans}_i = 1/(1 - \mathrm{loss\_rate}_i)$$

wherein $\mathrm{loss\_trans}_i$ represents the transformed loss rate of the i-th sample, and $\mathrm{loss\_rate}_i$ represents the loss rate of the i-th sample.

8. The method of claim 7, wherein the correlation coefficient is determined based on a result of an equation expressed as:

$$r = \frac{\sum_{i=1}^{W}\left(\left(\text{send\_rate}_i - \overline{\text{send\_rate}}\right)*\left(\text{loss\_trans}_i - \overline{\text{loss\_trans}}\right)\right)}{\sqrt{\sum_{i=1}^{W}\left(\text{send\_rate}_i - \overline{\text{send\_rate}}\right)^2} * \sqrt{\sum_{i=1}^{W}\left(\text{loss\_trans}_i - \overline{\text{loss\_trans}}\right)^2}}$$

wherein r represents the correlation coefficient, W represents the predetermined number for the sliding window, and send_rate$_i$ represents the sending rate of the i-th sample.

9. The method of claim 1, further comprising:
in response to the number of sampled packets in the sliding window exceeding the predetermined number and before determining the correlation coefficient, removing a sampled packet having an earliest timestamp from the sliding window until the number of the sampled packets in the sliding window is at the predetermined number.

10. The method of claim 1, wherein the estimated rate limit for traffic policing is determined by an average of the acknowledgement rates for all sampled packets in the sliding window.

11. A non-transitory computer readable medium storing instructions operable to cause one or more processors to perform operations according to the method of claim 1.

12. An apparatus of traffic policing detection and rate limit estimation for a network, comprising:
a memory; and
a processor, the processor configured to execute instructions stored in the memory to:
select, from the network, sampled packets having a loss rate greater than a first threshold, wherein the selected sampled packets are added to a sliding window for traffic policing detection;
in response to a number of sampled packets in the sliding window reaching a predetermined number, determine a correlation coefficient based on a sending rate and the loss rate of at least one sampled packet in the sliding window;
in response to the correlation coefficient exceeding a second threshold, determine whether traffic policing is occurring in the network based on the sending rate and a transformed loss rate of the at least one sampled packet in the sliding window; and
in response to a determination that traffic policing is occurring in the network, determine an estimated rate limit for traffic policing in the network based on an acknowledgement rate of the at least one sampled packet in the sliding window, and adjust bandwidth estimation (BWE) for congestion control in the network based on the estimated rate limit for traffic policing.

13. The apparatus of claim 12, wherein at least one of:
the correlation coefficient is determined based on the sending rate and the loss rate of each sampled packet in the sliding window;
whether traffic policing is occurring in the network is determined based on the sending rate and the transformed loss rate of each sampled packet in the sliding window; or
the estimated rate limit for traffic policing in the network is determined based on the acknowledgement rate of each sampled packet in the sliding window.

14. The apparatus of claim 12, wherein the instructions to determine whether traffic policing is occurring in the network based on the sending rate and the transformed loss rate of at least one sampled packet in the sliding window comprise instructions to:
determine an intercept by linear fitting the sending rate and the transformed loss rate of the at least one sampled packet in the sliding window; and
determine whether traffic policing is occurring in the network based on the intercept.

15. The apparatus of claim 14, wherein the instructions to determine whether traffic policing is occurring in the network based on the intercept comprise instructions to:
in response to a determination that a transformed intercept is within a third threshold, determine that traffic policing is occurring in the network, wherein the transformed intercept is determined from the intercept; and
in response to a determination that the transformed intercept exceeds the third threshold, determine that no traffic policing is occurring in the network.

16. The apparatus of claim 12, wherein the loss rate of a sampled packet is determined based on a result of an equation expressed as:

$$\text{loss\_rate} = \frac{\text{total\_pkts\_sent}_{intvl} - \text{total\_pkts\_ack}_{intvl}}{\text{total\_pkts\_sent}_{intvl}}$$

wherein total_pkts_sent$_{intvl}$ represents total bytes sent in a current sampling period, total_pkts_ack$_{intvl}$ represents total bytes acknowledged in the current sampling period, and loss_rate represents the loss rate of the sampled packet.

17. The apparatus of claim 16, wherein the sending rate and the loss rate of the sampled packet conform to a numerical relationship indicated by:

$$\text{send\_rate} = \frac{\text{ack\_rate}}{1 - \text{loss\_rate}}$$

wherein send_rate and ack_rate represent the sending rate and the acknowledgement rate of the sampled packet respectively.

18. The apparatus of claim 12, wherein the transformed loss rate of an i-th sample in the sliding window is determined based on a result of an equation expressed as:

$$\text{loss\_trans}_i = 1/(1 - \text{loss\_rate}_i)$$

wherein loss_trans$_i$ represents the transformed loss rate of the i-th sample, and loss_rate$_i$ represents the loss rate of the i-th sample.

19. The apparatus of claim 18, wherein the correlation coefficient is determined based on a result of an equation expressed as:

$$r = \frac{\sum_{i=1}^{W}\left(\left(\text{send\_rate}_i - \overline{\text{send\_rate}}\right)*\left(\text{loss\_trans}_i - \overline{\text{loss\_trans}}\right)\right)}{\sqrt{\sum_{i=1}^{W}\left(\text{send\_rate}_i - \overline{\text{send\_rate}}\right)^2} * \sqrt{\sum_{i=1}^{W}\left(\text{loss\_trans}_i - \overline{\text{loss\_trans}}\right)^2}}$$

wherein r represents the correlation coefficient, W represents the predetermined number for the sliding window, and $send\_rate_i$ represents the sending rate of the i-th sample.

20. The apparatus of claim 12, wherein the instructions stored in the memory further comprise instructions to:

in response to the number of sampled packets in the sliding window exceeding the predetermined number and before determining the correlation coefficient, remove a sampled packet having an earliest timestamp from the sliding window until the number of the sampled packets in the sliding window is at the predetermined number.

\* \* \* \* \*